United States Patent [19]

Waniczek et al.

[11] Patent Number: 4,650,826
[45] Date of Patent: Mar. 17, 1987

[54] STABILIZED CYANOACRYLATE ADHESIVES CONTAINING BIS-TRIALKYLSILYL ESTERS OF SULFURIC ACID

[75] Inventors: Helmut Waniczek, Cologne; Wilfried Kniege, Bergisch-Gladbach, both of Fed. Rep. of Germany

[73] Assignee: Bayer Aktiengesellschaft, Leverkusen, Fed. Rep. of Germany

[21] Appl. No.: 720,635

[22] Filed: Apr. 8, 1985

[30] Foreign Application Priority Data

Apr. 19, 1984 [DE] Fed. Rep. of Germany ....... 3414805

[51] Int. Cl.$^4$ ............................ C08K 5/54; C08J 3/00; C08F 2/40
[52] U.S. Cl. .................................... 524/730; 524/156; 524/262; 524/731; 524/850
[58] Field of Search ............... 524/156, 262, 730, 731, 524/850

[56] References Cited

U.S. PATENT DOCUMENTS 4,565,883  1/1986  Sieger et al. ..................... 549/475

FOREIGN PATENT DOCUMENTS 2128985  1/1973  Fed. Rep. of Germany .
2535335  4/1984  France .
2129003  5/1984  United Kingdom .
2148312  5/1985  United Kingdom .
2148313  5/1985  United Kingdom .

*Primary Examiner*—Herbert J. Lilling
*Attorney, Agent, or Firm*—Connolly and Hutz

[57] ABSTRACT

This invention relates to stabilized adhesives, to which silyl esters are added for stabilization.

1 Claim, No Drawings

STABILIZED CYANOACRYLATE ADHESIVES CONTAINING BIS-TRIALKYLSILYL ESTERS OF SULFURIC ACID

This invention relates to stabilized adhesives, to which silyl esters are added for stabilization.

It is known that monomeric cyanacrylic acid esters can be stabilized with respect to polymerization by addition of small quantities of acidic gases, such as $SO_2$ and radical scavengers, such as hydroquinone (e.g. U.S. Pat. Nos. 2,794,783 and 2,765,332).

However, the use of $SO_2$ suffers from a series of disadvantages:

A concentration of from 0.001 to 0.01% by weight has to be observed as the setting speed of the cyanacrylates decreases with higher $SO_2$ concentrations, and the cyanacrylates are not sufficiently stabilized with lower concentrations. The quantity can only be adjusted with difficulty owing to the gaseous state of the stabilizer and the low concentration.

The monomeric cyanacrylates are conventionally obtained by depolymerisation of polycyanacrylates. In this production method more of the acidic stabilizing gas is suitably added during the gas phase than is required for stabilization. After cooling, excess $SO_2$ has to be removed by means of time-consuming operations in order to provide a product which has sufficient stability and cuning speed. Continual determination of the $SO_2$ content is required. The monomer which has been stabilized in this manner yields $SO_2$ under certain conditions.

The known non-gaseous stabilizers, such as sulphonic acids, have either only a moderately-stabilizing effect or they seriously reduce the setting speed. Thus, for example, a cyanacrylate adhesive which can firmly bond two nitrile rubber sections together in two seconds, can be so modified by the addition of only 0.5% by weight of methane sulphonic acid that adhesion no longer takes place even within 10 seconds.

It is also known to add sulphonic acid anhydrides to reduce the delay in setting of cyanacrylates (e.g. German 2 128 985). However, the rapid setting speed and good stability in storage desired in modern methods of adhesive production are not always achieved by using sulphonic acid anhydrides. Owing to their hydrolysis sensitivity, they almost always contain sulphonic acids. As traces of water can only be excluded with difficulty from the storage or use of an adhesive, the proportion of sulphonic acids in the adhesive can be even higher.

Silicon compound-containing cyanacrylates are known and described, for example, in Japanese Pat. No. 73 103 633. However, these Si compounds serve to make the cyanacrylates hydrophobic and do not contribute to the improvement of stability in storage.

It has now been found that cyanacrylate adhesives can be stabilized, while avoiding the above disadvantages, by the addition of silyl esters of strong mono- or poly-valent inorganic or organic mono- or polyacids. The setting speed and stability in storage is markedly greater than with hitherto known stabilized cyanacrylate adhesives.

Thus, this invention relates to stabilized adhesives consisting of anionically polymerisable monomeric olefins corresponding to the formula (I)

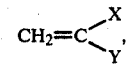

wherein
X represents CN and COOR, and
Y represents CN, halogen, such as chlorine and bromine, $SO_3R$ and —COOR, and R represents a $C_1$–$C_{20}$ alkyl or alkenyl group, a $C_5$–$C_{10}$ cycloalkyl group or an aryl group having 6 carbon atoms, such as phenyl, and a silyl ester of a strong acid and optionally other conventional additives.

Cyanacrylic acid esters corresponding to the formula (II)

wherein R is as defined in formula (I), methylene malodinitrile or compounds corresponding to formula (III)

wherein R is also as defined in formula (I), can, for example, be used as anionically polymerisable monomer olefins.

Cyanacrylic acid esters corresponding to formula (II) are preferably used.

Silyl esters of strong mono- or poly-valent inorganic or organic mono- or poly-acids, such as mono-, di- or tri-alkyl silyl esters of strong acids such as hydrohalic acids, mono-, di- or tri-sulphuric acid, mono-, di- or poly-phosphoric acid, substituted or unsubstituted alkyl-, cycloalkyl-, aryl- or aralkyl-sulphonic acids, chlorosulphonic acid, sulphinic acid esters, nitric acid or substituted or unsubstituted carboxylic acids are used according to the invention.

Examples of silyl esters of strong mono- or polybasic inorganic or organic mono- or poly-acids are tetrachlorosilane, methyl-, ethyl- and butyltrichlorosilane, dimethyl-, diethyl- or dibutyldichlorosilane, trimethyl-, triethyl- or tributylchlorosilane, bis-trimethylsilyl sulphuric acid, bis-triethylsilyl-disulphuric acid, bis-tributyltrisulphuric acid, dimeric dimethylsilylsulphate, tris-trimethyl-, tris-triethyl- or tris-tributylphosphate, 6-butyl-4,6-dimethyl-1,2,6-oxathiosilinane-2,2-dioxide, trimethylsilylchlorosulphonate, trimethylsilylmethane, sulphinate, trimethylsilylnitrate or trimethylsilyltrifluoroacetate.

Bis-trialkylsilyl esters of mono-, di- and tri-sulphuric acid corresponding to formula (IV)

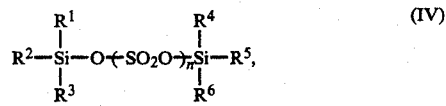

wherein
$R^1$ to $R^6$ are the same or different and represent a $C_1$–$C_{10}$ alkyl-, aryl- or aralkyl group, and
n represents an integer of from 1 to 3,
are preferably used.

Bis-trialkylsilyl esters of monosulphuric acid, such as bis-trimethylsilyl sulphate are most preferably used.

The stabilizers for adhesives used according to the invention are produced by known methods. Their production is summarized in, for example, Houben-Weyl, Methoden der organischen Chemie, Vol 13/5, pages 163 to 175, 4th edition, Georg Thieme Verlag Stuttgart New York, 1980.

The superiority of the stabilizers used according to the invention for anionically readily polymerisable monomers resides in the fact that they are straightforward to produce and simple to handle and that the adhesives set more rapidly and have greater stability in storage than in the state of the art.

A further advantage of the stabilizers according to the invention resides in the fact that they can be used as anionic inhibitors in the synthesis of anionically readily polymerising monomers, such as α-cyanacrylates. This makes redundant the addition of known stabilizers in the production thereof so that they do not have to be trivially removed by costly methods.

The stabilizers used according to the invention, such as the silyl esters of inorganic acids, such as phosphoric acid or sulphuric acid, also have the advantage that their decomposition products do not yield distillable acidic compounds under the effects of moisture, for example. If, for example, cyanacrylates are stabilized with sulphonic acid anhydrides, this cyanacrylate can scarcely be freed by distillation from sulphonic acid which may be present. However, if a cyanacrylate contains bis-trimethylsilylsulphuric acid according to the invention, for example, sulphuric acid and hexamethyldisiloxane are produced under the effects of moisture. If a cyanacrylate which has been stabilized in this manner is distilled, then only the stabilizer and the cyanacrylate distill off under suitable conditions. The hexamethyldisiloxane which in certain cases also distills off does not have a detrimental effect.

The quantity of stabilizer added to the monomeric olefin is from 0.0005 to 3% by weight. The stabilizer content according to the present invention is preferably from 0.001 to 1% by weight, most preferably from 0.001 to 0.1% by weight, based on the quantity by weight of olefin used.

In exceptional cases, further additives, such as stabilizers of anionic and radical polymerisation, such as $SO_2$, sulphonic acids, sulphonic acid anhydrides, hydroquinone, p-methoxyphenol or quinone can be added to the anionically readily polymerisable monomers in addition to the stabilizers used according to the invention.

Furthermore, the stabilized adhesives according to the invention can contain further conventional additives, which, for example, influence the viscosity or reduce the brittleness of the cured adhesive. These measures have already been described in the relevant literature. Thus, it is possible to add polymers, such as poly-methyl methacrylate, fillers, such as highly-dispersed silica, or plasticisers, such as tricresylphosphate.

The stabilized anionically readily polymerisable monomers according to the invention, such as α-cyanacrylates, are very suitable as rapid-setting single-component adhesives which are stable in storage. They set rapidly particularly when in the form of thin layers. The most varied substrates, such as plastic materials, metal, earthenware, wood or glass, can be bonded with the cyanacrylates which have been stabilized according to the present invention.

EXAMPLE 1

100 g of the α-cyanacrylic acid methyl ester produced by depolymerisation of polycyanacrylic acid methyl esters are mixed with the quantities of bis-trimethylsilyl sulphate (BTSS) given in the following Table. In order to test the stability in storage, the samples are poured into flasks of polyethylene and are stored in a heating chamber at 77° C. The stability in storage is measured by cooling the samples at regular time intervals to room temperature and assessing their state of aggregation.

In order to test the setting speed, single-row overlapped adhesives are produced with the cyanacrylate adhesives which have been stabilized as given above, as described in VDI 229 (5.1.1.), iron (ST 1303) and SMC (cross-linked unsaturated glass fibre-reinforced polyester resin) being used as joining materials. The samples are produced and the adhesive strength is determined by the shear tension test according to DIN 53 283. The combined tension and shear resistances are determined at various time intervals after the adhesive has been produced.

| BTSS | | State of aggregation after x hours of storage at 77° C. | | | | | |
|---|---|---|---|---|---|---|---|
| | | | | x hours | | | |
| (mg) | | 12 | 24 | 36 | 48 | 60 | 72 |
| (a) | 25.6 | low viscosity | low viscosity | low viscosity | slightly more viscous | viscous | wax-like |
| (b) | 12.8 | " | " | " | low viscosity | slightly viscous | viscous |
| (c) | 6.4 | " | " | " | " | low viscosity | slightly more viscous |
| (d) | 3.2 | " | " | " | slightly more viscous | viscous | wax-like |
| (e) | 1.6 | " | " | " | viscous | wax-like | hard |

| | | Combined tension and shear resistance (MPa) | | | | | | |
|---|---|---|---|---|---|---|---|---|
| | BTSS | iron/iron setting time (minutes) | | | SMC/SMC setting time (minutes) | | | |
| | (mg) | 15 | 30 | 1440 | 7.5 | 15 | 30 | 1440 |
| (a) | 25.6 | | | | 1.7 | 3.3 | 5.1 | 9.9* |
| (b) | 12.8 | | | | 3.1 | 8.4 | 8.7* | 10.0* |
| (c) | 6.4 | 9.2 | 10.0 | 10.1 | 7.6 | 9.0* | 9.6* | 11.3* |
| (d) | 3.2 | 11.5 | 9.2 | 9.6 | 8.3* | 10.3* | 8.7* | 10.0* |
| (e) | 1.6 | 11.4 | 11.2 | 11.0 | 9.7* | 9.9* | 10.7* | 10.3* |

*predominantly a strip from the joining part.
The combined tension and shear resistance values are average values of 10 individual measurements respectively.

COMPARATIVE EXAMPLE

As in Example 1, 100 g of cyanacrylic acid methyl ester are mixed with the quantities given in the following Table of methane sulphonic acid anhydride (MSA) and the stability in storage and setting speed are measured:

| MSA | State of aggregation after x hours storage at 77° C. | | | | | |
|---|---|---|---|---|---|---|
| (mg) | 12 | 24 | 36 | 48 | 60 | 72 |
| (a) 25.6 | viscous | highly-viscous | hard | | | |
| (b) 12.8 | viscous | highly-viscous | hard | | | |
| (c) 6.4 | viscous | highly-viscous | hard | | | |
| (d) 3.2 | highly-viscous | hard | | | | |
| (e) 1.6 | hard | hard | | | | |

| | Combined tension and shear resistance (MPa) | | | | | | |
|---|---|---|---|---|---|---|---|
| MSA | iron/iron setting time (minutes) | | | SMC/SMC setting time (minutes) | | | |
| (mg) | 15 | 30 | 1440 | 7.5 | 15 | 30 | 1440 |
| (a) 25.6 | | | | 0.1 | 0.1 | 0.6 | 8.5* |
| (b) 12.8 | | | | 0.1 | 1.5 | 1.1 | 8.5* |
| (c) 6.4 | 6.8 | 5.7 | 10.1 | 0.1 | 2.6 | 2.8 | 8.6* |
| (d) 3.2 | 5.4 | 5.5 | 12.4 | 4.8 | 5.6 | 4.7 | 8.3 |
| (e) 1.6 | 7.5 | 7.1 | 10.1 | 6.0 | 4.2 | 5.2 | 8.5* |

*predominantly strips from the joining part
The above combined tension and shear resistance values are average values from 10 individual measurements respectively.

The measured results given show that the adhesives which have been stabilized according to the invention have a very rapid setting speed and good stability in storage.

We claim:
1. Stabilized adhesives comprising anionically polymerizable monomeric olefins corresponding to the formula

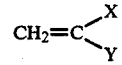

wherein
X represents CN and COOR,
Y represents halogen, SO$_3$R and —COOR,
and R represents a C$_1$–C$_{20}$ alkyl or alkenyl group, a C$_5$–C$_{10}$ cycloalkyl group or an aryl group, and a bis-trialkylsilyl ester of mono- , di- or tri-sulphuric acid corresponding to the formula

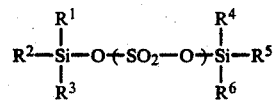

wherein
R$^1$ to R$^6$ are the same or different and represent a C$_1$–C$_{10}$ alkyl, -aryl or -aralkyl group, and
n rerpesents an integer of from 1 to 3, as a stabilizer.

* * * * *